United States Patent Office 2,965,038
Patented Dec. 20, 1960

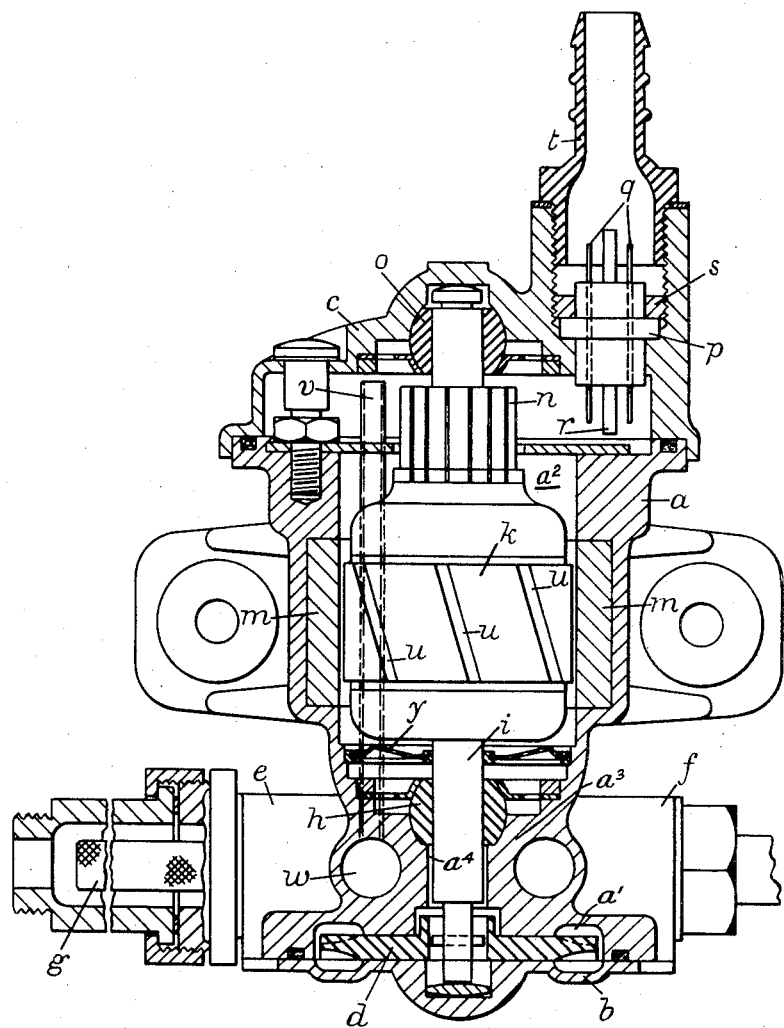

2,965,038
ROTARY FUEL PUMPS

Robert Hesketh Purden, Solihull, and Kazimierz Felski, Tyseley, England, assignors to Joseph Lucas (Industries) Limited, Birmingham, England Filed May 19, 1958, Ser. No. 736,192

Claims priority, application Great Britain June 3, 1957

2 Claims. (Cl. 103—87)

This invention relates to fuel pumps used for supplying petrol or other liquid fuel from a tank to a road vehicle or other engine, and of the kind comprising a rotary impeller and, an electric motor for driving the impeller. Such pumps are usually of small size and are intended to be mounted in, on or adjacent the fuel tank. Considerations of size, and of the conditions under which these pumps are used, necessitates that they shall be of simple and robust construction, reliable in action, and needing little or no attention after they have been installed.

To meet the above requirements it is already known to combine the impeller and the motor armature in a totally closed housing shaped to provide a chamber for accommodating the pump impeller, and another chamber for containing the armature and other component parts of the motor. Also provision has been made for allowing some of the fuel to leak from the impeller chamber and fill the motor chamber. An advantage of this latter provision is that it obviates the need for placing between the two chambers a seal which may give trouble due to wear and the need for periodic renewal. A further advantage is that by so flooding the interior of the motor, the spindle bearings are kept in a wet condition which obviates the need for periodic lubrication. It has been found, however, that the accumulation of stagnant fuel in the motor results in a disadvantage, in that a gummy deposit is liable to accumulate and impart the freedom of the spindle in its bearings.

The principal object of the present invention is to provide an improved construction whereby the said disadvantage can be reliably avoided. Further objects are to enable other desirable conditions to be satisfied as hereinafter described.

A combined pump and motor in accordance with the invention comprises a construction wherein helical or like ducts are provided on the peripheral surface of the armature for producing a longitudinal flow of fuel through the motor, and a return duct extending from the end of the housing remote from the impeller to the pump inlet.

The accompanying drawing illustrates a typical embodiment of the invention.

Referring to the drawing, a hollow body part $a$ of substantially cylindrical form is provided with separately formed end covers $b$, $c$. The cover $b$ and the adjacent end of the body part are shaped to form a chamber $a^1$ for accommodating the rotary impeller $d$ of the pump. In this end of the body part are also formed the pump inlet $e$, and outlet $f$. If desired the inlet may have combined with it a filter $g$. Also in this end of the body part is contained a self-aligning bearing $h$ for supporting the end of the motor armature spindle $i$, to which the impeller is attached. This bearing consists of a bush of spherical form located in a complementary socket, the bush being preferably made from a non-metallic material such as a material consisting wholly or in part of graphite.

The other portion of the body part is shaped to form a chamber $a^2$ for accommodating the motor armature $k$, and a permanent magnet with appropriate pole pieces $m$ for providing the required magnetic field. The associated end cover $c$ carries the brushes (not shown) of the commutator $n$, and also a self aligning bearing $o$ for the adjacent end of the armature spindle, this bearing being similar to the other bearing above described. Also on this end is provided the means required for connecting the electric current supply cable to the motor. Such means includes a plug $p$ of electrical insulating material through which extend a pair of metal strips $q$ adapted at one end for attachment by wires (not shown) to the commutator brushes, the other ends being adapted for attachment to the current supply cable, a flat extension $r$ being formed on each end of the plug for preventing accidental contact of the said metal pieces with each other. The plug is supported and sealed in a socket in the end cover, and is held in position by a screw threaded bush $s$. Further the portion of the end cover which contains the said cable-connecting means has attached to it a sleeve $t$ made from, for example, nylon. The chambers $a^1$ and $a^2$ are separated from each other by a portion $a^3$ of the body part, this portion of the body part being formed with a bore $a^4$ through which the armature spindle $i$ extends, and in which the spindle is supported by the bearing $h$ with sufficient clearance to permit a restricted flow of fuel from the impeller-containing chamber $a^1$ to the motor-containing chamber $a^2$.

According to the principal feature of the invention the peripheral surface of the armature has formed in it a plurality of open-ended helical or like oblique grooves $u$, which may be the grooves which accommodate the armature windings. Also within the housing is included a pipe $v$ or other duct leading from a position adjacent the end of the housing remote from the pump to a passage $w$ in the pump inlet.

The construction is such that some liquid can be by-passed at a restricted rate from the pump outlet around the spindle $i$ to the interior of the motor. This liquid fills the motor spaces, and, when the armature is rotating, can be impelled along the housing by the helical grooves in the armature towards the remote end of the housing, the liquid being returned along the above mentioned pipe or duct to the pump inlet, so that liquid is constantly circulated through the motor while the latter is in action. One effect of the circulating liquid is to promote cooling of the motor, and another is to maintain the bearings in the desired wet condition. A further advantage resulting from circulation of the liquid is that it obviates the fouling of the motor which is liable to occur when the liquid is permanently stagnant.

Preferably there is also contained in the housing between the motor armature and pump, a flame trap $y$ consisting of an annular disc of wire gauze which fits closely both the housing and the armature spindle. To impart flexibility to the said disc, so that it can adapt itself to small lateral displacements of the spindle, it has formed on it one or more annular corrugations. The flame trap serves to confine to the motor chamber a flame which may occur in the event of ignition of an explosive mixture of the fuel and air which may accumulate in the chamber and may be ignited by sparking at the commutator.

Having thus described our invention, what we claim as new and desire to secure by Letters Patent is:

1. A fuel pump comprising in combination a rotary impeller, an electric motor having an armature for imparting rotation to the impeller, a spindle on which the motor armature and the impeller are mounted, a housing having therein a pair of chambers respectively containing the armature and impeller, said chambers being separated from each other by a part of the housing and communicating only through a bore in which the spindle extends, a bearing supporting the spindle within the said bore with sufficient clearance to permit a restricted flow of fuel through the bore, from the impeller-containing chamber to the armature-containing chamber, a fuel inlet and a fuel outlet communicating with the impeller-containing chamber, and a fuel-return duct which communicates at one end with the said inlet and extends to a position adjacent the end of the armature-containing chamber remote from the impeller, and through which duct fuel entering the armature-containing chamber from the impeller-containing chamber can be returned to the said inlet after having passed the motor armature, the periphery of the latter being provided with open-ended oblique grooves by which the fuel in the armature-containing chamber can be impelled, during rotation of the motor armature, towards the end of the armature-containing chamber remote from the impeller.

2. A fuel pump according to claim 1, having in the end of the motor-containing chamber nearest the impeller-containing chamber a flame trap consisting of a flexible annular disc of wire gauze which closely fits the adjacent portions of the motor-containing chamber and the armature spindle, and which is provided with at least one annular corrugation for enabling the disc to adapt itself to small lateral displacements of the spindle.

References Cited in the file of this patent
UNITED STATES PATENTS

| | | |
|---|---|---|
| 2,406,947 | Harlamoff | Sept. 3, 1946 |
| 2,468,187 | Ericson | Apr. 26, 1949 |
| 2,517,233 | Peters | Aug. 1, 1950 |
| 2,556,435 | Moehrl et al. | June 12, 1951 |
| 2,688,946 | Jarsaillon | Sept. 14, 1954 |
| 2,741,990 | White | Apr. 17, 1956 |
| 2,747,512 | Fouche | May 29, 1956 |